Patented May 2, 1933

1,907,317

UNITED STATES PATENT OFFICE

RALPH L. BROWN, OF SYRACUSE, NEW YORK, AND WILLIAM W. ODELL, OF PITTSBURGH, PENNSYLVANIA

PROCESS FOR PRODUCING HYDRATION PRODUCTS FROM UNSATURATED HYDROCARBONS AND WATER

No Drawing. Original application filed June 11, 1927, Serial No. 198,202. Divided and this application filed October 14, 1929. Serial No. 399,693.

This application is a division of our application for "process and apparatus for producing reaction products from hydrocarbons and water" Serial No. 198,202 filed June 11th, 1927, now Patent No. 1,873,536 of August 23, 1932, the claims in this specification being confined more particularly to a process for the production of alcohols, ethers and mixed ethers from unsaturated hydrocarbons and liquid water. The claims in the original application were confined chiefly to the operation in the vapor phase whereas in this divisional application this limitation is not made.

This invention relates to, the process of producing reaction products from hydrocarbons and water, by bringing them together under controlled condition with respect to temperature and pressure, in a suitable reaction chamber, causing chemical reaction to take place and increasing the speed of reaction, which is normally extremely slow, by catalytic means.

The objects of this invention are:

1.—To prepare alcohols and ethers from hydrocarbons of the olefin series.

2.—To prepare from unsaturated hydrocarbons by chemical reaction with water, oxidized and partly oxidized products.

3.—To effectively utilize certain byproduct gases which are rich in unsaturates and which are wastefully used at present.

4.—To prepare hydrocarbon-water reaction products by a continuous process.

5.—To cause reaction to take place between hydrocarbons and water without the aid of an acid.

6.—To produce, in a single continuous process, either an alcohol, an ether, both an alcohol and an ether or other hydration product by merely altering the temperature, pressures and relative concentrations of the reacting substances—water and unsaturated hydrocarbons.

Some equations which are representative of the results obtainable with our process and which will be referred to hereinafter are as follows:

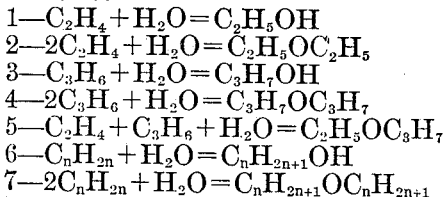

These equations are only representative of class reactions; other members of the series or unsaturated hydrocarbons of other than the olefin series combine with water in like manner by similar equations.

The production of ethyl alcohol ($C_2H_5OH$) from ethylene ($C_2H_4$) is not new but attention is called to the fact that the processes thus far proposed for making the former from the latter are not continuous nor can they be made continuous, so far as we are aware of. It will be noted that in processes suggested for thus preparing alcohol, an acid such as sulphuric acid ($H_2SO_4$) is employed, the reason being that the alcohol is produced by a double reaction in which the acid enters chemically as in the following equations:

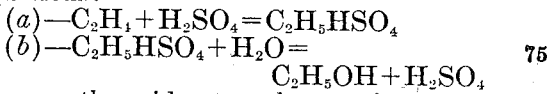

Because the acid enters the reaction and because of the duplex nature of the reaction it is understood why this method of producing alcohol is carried out as a batch process. The corrosive nature of the liquids which must be pumped and handled in processes using acids necessitates the use of special and expensive equipment. The process being carried on at high pressure with acid is rather hazardous.

We have found that when water and ethylene are brought together under high pressure and at definite temperatures a direct combination takes place as shown in Equations 1 and 2, when a catalytic agent is used; the reaction products being alcohol or ether according to the relative concentration of the reacting substances. The conditions under which these and similar reactions such as shown in Equations 3, 4, 5, 6, and 7 take place are quite definite. We make use of the catalytic power of the contact surfaces of certain solids to effect chemical combination directly between hydrocarbons and water. The catalyzer does not enter into chemical reaction in our process, or in any process, but merely increases tremendously the velocity of reaction above that which obtains without a catalyst. The reactions without a catalyst, and by this general process, take place at so low a rate as to be impractical of commercial application.

A review of the literature on this subject leads us to believe that the chemical combination of water and one or more olefines to form alcohols, ethers or other hydration products has never been accomplished without a third chemical agent which latter enters into the chemical reactions; in fact, in light of present day chemical experience and theories, it is impossible to thus prepare these products without said third chemical agent. This fact is one of the fundamentals upon which this application is made for patent and upon which our studies have been based. We do not require a third chemical agent to make these reactions possible by catalytic means when proper conditions obtain and we believe that the discovery of this process and the optimum conditions under which the reactions take place were made by us.

We have found experimentally that there are a number of catalytically active metal oxides which are satisfactory for increasing the velocity (reaction rate) in producing reaction products from water and unsaturated hydrocarbons. The oxides of aluminum, thorium, titanium, tungsten and chromium showed catalytic activity in this process. We do not limit ourselves to the use of these catalysts, for we believe that other catalysts will also function in like manner. Metal oxides containing small amounts of the oxides of cobalt, tungsten, thorium and the like are active catalysts. A combination of a plurality of metal-oxygen compounds is sometimes more satisfactory than a single oxide.

Briefly, the reactions are brought about by passing $H_2O$ and the hydrocarbon (or hydrocarbons) selected for the purpose, under pressure, continuously through a reaction chamber where said water and hydrocarbons while at an elevated temperature of about 100 degrees centigrade to 500 degrees centigrade are caused to contact a solid catalyst enroute through said chamber. It is preferable to pass the reacting substances through said chamber continuously but obviously the same result can be obtained in intermittent or cycle operation. Ethers are more readily prepared by this process when the concentration ratio of the reacting substances— hydrocarbon to water—expressed in mols per unit volume is greater than 1 to 1. The percentage of ethers in the reaction products increases as said concentration ratio increases above 1 to 1. The ratio "called for" to satisfy the chemical equations is 2 to 1 but we find that maximum yield is obtained when an excess of hydrocarbon is used. The conditions which are most favorable for the production of alcohols is the reverse of this; namely, for high yields of an alcohol containing only small amounts or traces of an ether the concentration ratio of the reacting substances should not be appreciably greater than 1 to 1 (molecular proportions) and preferably should be less than 1 to 1; expressed differently, an excess of $H_2O$ in the reacting mixture favors the production of alcohols; an excess of hydrocarbons favors the production of ethers.

Suitable temperatures for operating with our process are substantially within the limits 100° C. to 600° C. The exact optimum temperature varies with the catalyst and with the condition or activity of it, and also with the particular hydrocarbons being treated. The higher members of the series, that is, hydrocarbons of high molecular weight react most favorably at lower temperatures than those of relatively low molecular weight, other factors remaining the same. Optimum temperatures also are functions of the pressures used, or, vice versa, the optimum pressures are functions of temperatures. For example, for the production of alcohol of low ether content from ethylene ($C_2H_4$) the ethylene pressure is advantageously kept at about 10 atmospheres when the temperature of the reacting mediums ($C_2H_4$ and $H_2O$) is about 175° C.; at about 25 atmospheres near 225° C. and at about 60 atmospheres pressure at temperatures near 275° C. Somewhat lower temperatures than these can be used for making hydration products using unsaturated hydrocarbons of higher molecular weight than ethylene.

Our process is distinct from others, so far as we are aware of, in that it permits of a continuous operation of the reactions yielding alcohols or ethers in a reaction chamber without the use of acids. It will be noted that the concentration of the acids which are used in other processes and which are ever being diluted during operation, is not a branch operation in the production of alcohols and ethers by our process.

We find that it is possible to pass a gas containing unsaturated hydrocarbons such as an olefin along with steam, heated and under pressure, over a catalyst—active contact surface—and produce an alcohol which can be removed by condensing and scrubbing or by absorption by an absorbent such as activated carbon, silica jell or the like. Applied to commercial combustible gases containing olefins or other unsaturated hydrocarbon gas it is possible to utilize said hydrocarbons to better advantage than by burning them as fuel, by their conversion into alcohols or ethers.

In general, the rate of conversion of the hydrocarbons into alcohols and ethers is higher with high pressure than with low pressure but in order to operate in the gaseous phase it is necessary to adjust temperatures as the pressure is adjusted. This means that for a given pressure there is a minimum temperature below which operation is not economic; this temperature is substantially the temperature at which the vapor pressure of the reacting substances equals the pressure in the system. Expressed differently we prefer to operate under some conditions with the reacting substances in the vapor phase but the temperature-pressure conditions may be such that the vapors are not in the form of dry gases. Obviously then, when the concentrations of the reacting substances are changed, as when changing the operation from alcohol to ether production, the optimum conditions of temperature and pressure are altered. This is one reason why the optimum pressures, using hydrocarbons of higher molecular weight than $C_2H_4$ are lower, their vapor pressures at a given temperature are lower; to keep them in the gaseous phase it is necessary to either increase the temperature or decrease the pressure. With members high in the olefin series it is preferable to work at moderately low pressures.

For the production of ether
from $C_2H_4$ and $H_2O$, alumina ($Al_2O_3$) is a good catalyst and a satisfactory working temperature is as low as 250° C. using an excess of $C_2H_4$ above that required for alcohol production and preferably using an excess of the amount required to satisfy Equation Number 2. When making alcohol ($C_2H_5OH$) from $C_2H_4$ and $H_2O$ 360° C. is a better working temperature and the $H_2O$ should preferably be in excess of the amount required to balance Equation Number 1. Using $TiO_2$ as a catalyst a satisfactory working temperature is about 350° C. Thoria ($ThO_2$) is a good catalyst and good results are obtained with it at 280° C. to 350° C.; 325° C. being a good average temperature at which operations are satisfactory with thoria. Blue oxide of tungsten functions between 250° C. and 400° C.; 350° C. being a good average working temperature.

Another advantage of our process over those employing acid is that in the latter processes certain olefins which are subject to polymerization are polymerized by contact with the acid and losses occur in efficiency and in alcohol yield. These losses are not experienced in our process.

Although olefins have been referred to as an example in the foregoing it is understood that many unsaturated hydrocarbons behave in a similar manner, hence we prefer not to limit ourselves to the use of olefins. For example, the drip oils from city-gas mains contain unsaturates and in particular, appreciably large amounts of styrene which can be converted by this means—treatment with steam under pressure in the presence of a catalyst—into methyl-phenyl-carbinol and phenyl-ethyl alcohol. The losses in processing by the latter means are very much less than by any other process known to us.

To operate by our process it is essential chiefly to bring the reactants—water and the unsaturated hydrocarbons—into as intimate contact with one another as possible, that is, thoroughly mixed, at a temperature above 100° C. and to cause this mixture to contact a solid catalyst having the property of catalyzing the hydration of unsaturated hydrocarbons to corresponding ethers or alcohols. Increasing the pressure facilitates the operation and it is only necessary to provide apparatus to withstand the pressure employed having means for retaining the catalyst and for causing the reactants to contact it in its passage therethrough; said apparatus or reaction chamber, which is not a part of the claims in this application, should have means whereby the temperature of the catalyst can be controlled.

It has been shown that definite temperature conditions should be maintained in the reaction chamber for a given reaction and since these reactions are exothermic it is necessary to make definite provisions for temperature control.

Steam or superheated steam in excess of molecular proportions may be used as a means of temperature control by introducing them directly into the mixture of reactants. Another means is the control of the initial temperature of the hydrocarbon admixed with steam. The water and hydrocarbons can be mixed before entering the reaction chamber or admitted to the reaction chamber separately at either a common temperature or at different temperatures and caused to become intimately mixed within said chamber.

We believe that in conjunction with the present oil refining processes and in connection with shale-oil refining processes our process will find extended application.

We claim:
1. The process of making hydration products from olefins which comprises contact- ing a mixture of liquid water and olefins with a solid hydration catalyst capable of promoting the hydration of said hydrocarbons thereby catalyticly forming said hydration products at a temperature with a lower limit about 100° C.

2. The process of making hydration products from olefins which comprises simultaneously contacting liquid water and olefins with a solid hydration catalyst capable of promoting the hydration of said hydrocarbons thereby catalyticly forming said hydration products at a temperature above 100° C. and at a pressure greater than atmospheric.

3. The process of making hydration products from olefins which comprises simultaneously contacting liquid water and olefins with a solid hydration catalyst capable of promoting the hydration of said hydrocarbons thereby catalyticly forming said hydration products at a temperature above 100° C. and at a pressure greater than 10 atmospheres.

4. The process of making hydration products from olefins which comprises simultaneously contacting liquid water and a plurality of olefins with a solid hydration catalyst capable of promoting the hydration of said hydrocarbons thereby catalyticly forming said hydration products at a temperature with a lower limit about 100° C.

5. The process of making hydration products from olefins which comprises simultaneously contacting liquid water and a plurality of olefins with a solid hydration catalyst comprising a metal oxide capable of promoting the hydration of said hydrocarbons thereby catalyticly forming said hydration products at a temperature above 100° C. and at a pressure greater than atmospheric.

6. The process of making hydration products from olefins which comprises contacting a mixture of water and a plurality of olefins with a solid hydration catalyst capable of promoting the hydration of said hydrocarbons thereby catalyticly forming said hydration products in the liquid phase at a temperature above 100° C. and at a pressure greater than 10 atmospheres absolute.

7. The process of making hydration products from olefins, comprising, simultaneously contacting liquid water and a plurality of olefins with a solid hydration catalyst which catalyst is an oxygen-containing compound of a heavy metal capable of promoting the hydration of said olefins, thereby catalytically forming said hydration products at a temperature with a lower limit about 100° C., the relative amounts of said olefins and water being so proportioned that said hydration products contain an ether.

8. The process of making hydration products, comprising simultaneously contacting liquid water and a plurality of olefins with a solid hydration catalyst which catalyst is an oxygen-containing compound of a metal capable of promoting the hydration of said olefins forming said hydration products by catalytic chemical reaction at a temperature above 100° C. but below the critical temperature of water and at a pressure greater than atmospheric, the relative amounts of said olefins and water being so proportioned that said hydration products include a mixed ether.

9. The process of making hydration products from olefins which comprises contacting liquid water and a plurality of olefins with a solid, metal oxide hydration catalyst capable of promoting the hydration of said hydrocarbons thereby forming by catalytic chemical reaction said hydration products at a temperature with a lower limit of 100° C. and at a pressure greater than atmospheric; said hydration products comprising ethers and alcohols.

10. The process of making hydration products from unsaturated hydrocarbon compounds having olefin linkages, comprising, causing liquid water and said hydrocarbon compounds to contact a solid hydration catalyst adapted to hydrate said compounds to ethers and alcohols and to react chemically by virtue of said catalyst at a temperature above 100° C. but below the critical temperature of water at a pressure greater than atmospheric forming said hydration products, the amounts of said water and hydrocarbon compounds used being so proportioned that said hydration products comprise an alcohol and an ether.

11. The process of making hydration products from unsaturated hydrocarbons having olefin linkages, comprising, simultaneously causing water and said hydrocarbon compounds, in the liquid phase, to contact a solid hydration catalyst capable of catalyzing the hydration of said compounds, at a temperature above 100° C. but below 365° C. and at a pressure greater than atmospheric, forming said hydration products including an alcohol and an ether by virtue of said catalyst.

12. The process of making hydration products from unsaturated hydrocarbon compounds which comprises contacting a mixture of said hydrocarbon compounds and water, in the liquid phase, with a solid, aluminum oxide catalyst capable of promoting the hydration of said hydrocarbon compounds to alcohols and ethers at a temperature above 100° C.

13. The process of making an hydration product from an olefin and liquid water, comprising, causing said water and said olefin in intimate mixture at a temperature above 100° C. to contact a solid hydration catalyst comprising an oxygen compound of a heavy metal thereby catalytically forming said hydration product, controlling the temperature of said catalyst by regulating the initial temperature of said olefin.

14. The process of making an hydration product from an olefin and liquid water, comprising, causing said water and said olefin in intimate mixture to contact a solid hydration catalyst at a temperature of 100° to 365° C., said catalyst comprising an oxygen compound of a heavy metal, thereby catalytically forming said hydration product, maintaining said catalyst at said temperature by controlling the initial temperature of said olefin.

15. The process of making an hydration product from an olefin and liquid water, comprising, introducing said olefin and water into a catalyst chamber containing a solid hydration catalyst adapted to catalyze the hydration of said olefin, causing said olefin and water to become intimately mixed and to contact said catalyst, maintaining said catalyst at a temperature of 100° C. to 365° C. by controlling the initial temperature of said olefin, thereby catalytically forming said reaction product.

16. The process of making an hydration product from an olefin and liquid water, comprising, introducing said olefin and water under superatmospheric pressure into a catalyst chamber containing a solid hydration catalyst adapted to catalyze the hydration of said olefin, causing said olefin and water to intimately contact said catalyst while under said pressure, maintaining said catalyst at a temperature above 100° C. but below 365° C., the critical temperature of water, by controlling the initial temperature of the reactants introduced into said chamber, thereby catalytically forming said reaction product.

RALPH L. BROWN.
WILLIAM W. ODELL.